Oct. 31, 1939. A. A. LAWRY 2,178,043
DENTAL PONTICS
Filed March 11, 1937
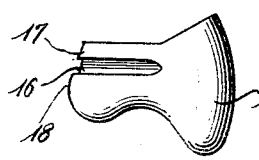
Fig. 1.
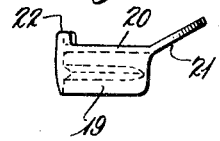
Fig. 3.
Fig. 15.
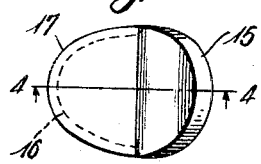
Fig. 2.
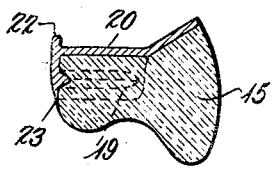
Fig. 4.
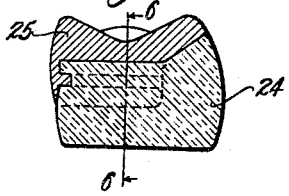
Fig. 5.
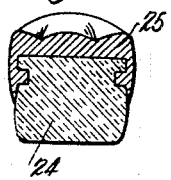
Fig. 6.
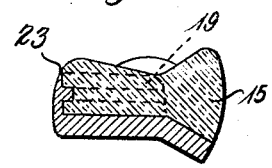
Fig. 7.
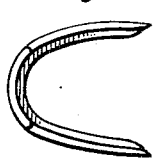
Fig. 8.
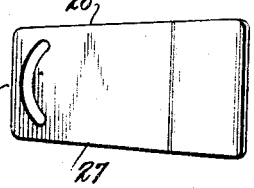
Fig. 9.
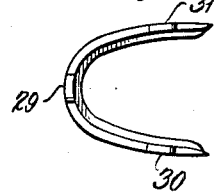
Fig. 12.
Fig. 10.
Fig. 11.
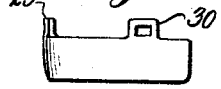
Fig. 13.
Inventor
Arthur A. Lawry
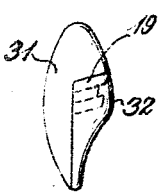
Fig. 14.
By Brower + Phelps
Attorney Patented Oct. 31, 1939

2,178,043

UNITED STATES PATENT OFFICE 2,178,043

DENTAL PONTICS

Arthur A. Lawry, Valdosta, Ga.

Application March 11, 1937, Serial No. 130,395

2 Claims. (Cl. 32—9)

The invention relates to artificial teeth and has as an object the provision of a tooth-metal joint capable of wide application.

It is a further object of the invention to provide a porcelain tooth body or body portion which may be embodied in any tooth such as incisor, cuspid, bicuspid or molar, in fact in any situation where an artificial tooth or portion thereof is to be joined to metal as for instance to a cusp plate, or backing.

It is a further object of the invention to provide a porcelain body either as a porcelain occlusal portion of a tooth or as a gingival filler for a pontic to be united to a cusp plate, or backing, or band whereby the metal portion may be soldered to the anchor abutments of a bridge.

It is a further object of the invention to provide a porcelain tooth or portion of a tooth having provision for a cemented joint with a metal portion wherein the body of the porcelain is solid, i. e. not partially divided or pierced by the joint with the metal.

It is to be understood that the drawing shown is not exhaustive of all applicable situations of fixed bridgework and removable bridgework or restorations, but is only illustrative of sufficient situations to show applicability and utility of the invention, i. e. the views shown in the drawing pertain to (1) a bicuspid pontic of the gingival filler type, (2) a bicuspid pontic showing porcelain cusps as applied to removable bridgework-partial denture restorations, (3) several forms of metal backings and metal backing or casting band with lugs, (4) an incisor pontic with its metallic support attached.

Further objects of the invention will appear from the following description when read in connection with the accompanying drawing showing illustrative embodiments of the invention, and wherein:

Figure 1 is a side elevation of a porcelain body;

Figure 2 is a plan view of the structure of Figure 1;

Figure 3 is a side elevation of a cusp plate or backing;

Figure 4 is a central vertical section on line 4—4 of Figure 2 showing the plate of Figure 3 applied to the body of Figure 1;

Figure 5 is a central vertical labio-lingual section of a porcelain body utilized as a gingival filling for a pontic and showing a wax or gold occlusal portion applied;

Figure 6 is a section on line 6—6 of Figure 5;

Figure 7 is a view similar to Figure 4 inverted, showing the result of excessive grinding in the fitting of the occlusal surface of the tooth to the opposing tooth as applied to use on removable restorations;

Figure 8 is a plan view of a metal band to fit the porcelain body of the invention;

Figure 9 is a plan view of the cusp plate to be applied for some purposes to the structure of Figure 8;

Figure 10 is a central vertical section showing the application of the structure of Figure 9 to the structure of Figure 8 before trimming;

Figure 11 is a section on line 11—11 of Figure 10 showing the plate trimmed and secured to the band forming a complete backing;

Figures 12 and 13 are plan views and side elevations respectively of a modified form of band;

Figure 14 is a side elevation of the invention applied to a porcelain incisor; and Figure 15 is a view similar to Figure 4 showing the result of excessive grinding of the porcelain pontic gingival filler type, without weakening the pontic.

In the artificial porcelain teeth now in quite universal use the porcelain body is united to or provision is made for uniting to, a metal cusp plate or backing by means of a rib entering a central groove in the tooth, which rib is made in a variety of forms. In other teeth in common use the porcelain is drilled and united with the metal by means of a vertical or horizontal pin. In still another form of teeth, the metal and the porcelain are united by a band joining the porcelain at a distinct ledge.

The first two forms of teeth referred to are greatly weakened and as a result there is a splitting of the porcelain at the weakened portion. In the last named form it is impossible to grind the porcelain back to the metal without exposure of a joint between the metal and the porcelain, causing frequent fracture at this point.

The tooth of the present invention has provision for being united with the metal in such a manner as to provide a minimum weakening of the porcelain and to provide a joint with the metal which leaves only a feather edge of metal exposed if excessive grinding becomes necessary.

In Figures 1, 2, 4, and 7, there is shown a porcelain body 15 having a groove 16 extending around the lingual side of the porcelain body into the inter-proximal sides. It will be seen that the portion 17 above the groove projects into a substantial alignment with the portion 18 therebelow, this being true both at the lingual side and the inter-proximal sides thereof.

In Figure 3 is shown in side elevation a band 19 formed integrally with a cusp plate 20 having a lower surface 21 to fit upon the porcelain body of Figure 1. To provide for an added bond with the metal which may be cast upon the cusp plate 20, there is shown a lug 22 at the lingual side of the cusp plate, or backing.

The assembly shown in Figure 4 may be soldered at the sides of the band 19 to the sides of anchor abutment caps of the bridge and added metal may be flowed upon the cusp plate up to or above the edge of ridge 22, thereby making the occlusal surface and a secure connection between the porcelain body used as a pontic, the porcelain body forming a porcelain tooth in the bridge with practically no metal exposed at the labial side.

In the event that excessive grinding to the extent shown in Figure 7 is necessary with the structure, only a line of metal will be exposed as at 23.

In Figures 5 and 6 the porcelain body 24 embodying the invention herein is utilized as a gingival filling of a pontic to close the space between the metal portion of the bridge and the gum. The invention in this instance may be utilized by forming the wax to the form of the occlusal surface of the pontic as at 25 which may be placed between the inter-proximal surfaces of the anchors and by the well known casting technique of dentistry the wax may be replaced by gold so as to provide a bridge embodying the gingival filling 24. The porcelain body 24 may then be slipped off and provided with cement to provide a permanent structure.

Dental mechanics not sufficiently skilled to produce the structure in the manner described with reference to Figures 5 and 6 may purchase a band such as shown in plan view in Figure 8 which if desired may be applied to the porcelain body 24, as shown in Figures 5 and 6, to assist in casting the gold cusp, or the band of Figure 8 may be equipped with the cusp plate of Figure 9, which plate may be soldered thereon and trimmed in the form shown in Figure 10, which may then be trimmed to the form shown in Figure 11 with the projecting portion 26 and the edges 27, 28 trimmed away flush with the band, thus providing a structure similar to that shown in Figure 3 and which may be utilized in the same manner.

In Figures 12 and 13 there is shown a band in the main similar to that in Figure 8 but having perforated lugs 29, 30, 31 projecting from the upper margin thereof to assist in making a secure joint between the band and added metal.

In Figure 14 there is shown a porcelain tooth in the form of an incisor 31 formed in accordance with the invention and having a metal backing 32 which may be used as a pontic in a bridge for the front of the mouth.

It will be seen that the portions 19 of the band of Figure 3, and 19' in Figure 14 provide ample surface for soldering to anchors of a bridge, and also ample cementing surface between the porcelain and the band.

Minor changes may be made in the physical embodiments of the invention within the scope of the appended claims without departing from the spirit thereof.

I claim:

1. An artificial tooth or pontic comprising: a porcelain body having a plane surface at an angle to its axis and a groove spaced from and substantially parallel with said surface, said groove extending about the lingual or palatal surface of the body and at least partly across the inter-proximal surfaces thereof; a metal plate portion overlying said plane surface and having a flange overlapping a portion of said lingual and inter-proximal surfaces of the body, with a rib projecting from said flange and entering said groove; and a flange substantially flush with said first-named flange projecting beyond the exposed surface of said plate portion to form an interlock with metal joined to said plate portion.

2. An artificial tooth or pontic comprising: a porcelain body having a plane surface at an angle to its axis and a groove spaced from and substantially parallel with said surface; said groove extending about the lingual or palatal surface of the body and at least partly across the inter-proximal surfaces thereof; a U shaped metal member to cover said groove, bearing a rib to enter said groove; said member dimensioned to have one edge flush with said plane surface with a flange portion projecting thereabove; and a metal plate having an opening to receive said flange portion; said plane to be superposed on said plane surface; whereby the plate may be soldered to the edge of the U shaped member and to said flange portion for retention on the porcelain body.

ARTHUR A. LAWRY.